United States Patent [19]

Levinson

[11] 3,779,903

[45] Dec. 18, 1973

[54] HYDROCONVERSION PROCESS WITH A CATALYST HAVING A HYDROGENATION COMPONENT COMPOSITED WITH A HIGH DENSITY ALUMINA

[75] Inventor: Gerald S. Levinson, San Francisco, Calif.

[73] Assignee: Shell Oil Company, New York, N.Y.

[22] Filed: Jan. 21, 1972

[21] Appl. No.: 219,790

Related U.S. Application Data

[60] Continuation-in-part of Ser. No. 689,342, Dec. 11, 1967, abandoned, Division of Ser. No. 36,721, May 13, 1970, Pat. No. 3,673,112.

[52] U.S. Cl............. 208/254 H, 208/216, 208/217
[51] Int. Cl............................................. C10g 23/02
[58] Field of Search.................... 208/254, 89, 216; 252/465, 452, 466

[56] References Cited
UNITED STATES PATENTS

| | | | |
|---|---|---|---|
| 2,883,337 | 4/1959 | Hartley et al. | 208/254 H |
| 3,340,180 | 9/1967 | Beuther et al. | 208/254 H |
| 3,322,666 | 5/1967 | Beuther et al. | 208/254 H |
| 2,760,907 | 8/1956 | Attane, Jr. et al. | 208/254 H |
| 2,905,636 | 9/1959 | Watkins et al. | 208/254 H |

Primary Examiner—Delbert E. Gantz
Assistant Examiner—G. J. Crasanakis
Attorney—Glen R. Grunewald

[57] ABSTRACT

Incorporation of 30–65 percent w of a hydrogenation metal component into a hydrogel which would yield on drying and calcining without the hydrogenation metals a xerogel of a high compacted bulk density (0.8–1.6 g/cc) low pore volume (0.15–0.45 cc/g) alumina results in a catalyst having a very high hydrogenation and denitrification activity. Up to about 10 percent fluoride is added to provide a cracking component. The hydrogenation metal component is selected from the oxides of nickel, molybdenum, tungsten, cobalt and mixtures thereof.

5 Claims, 1 Drawing Figure

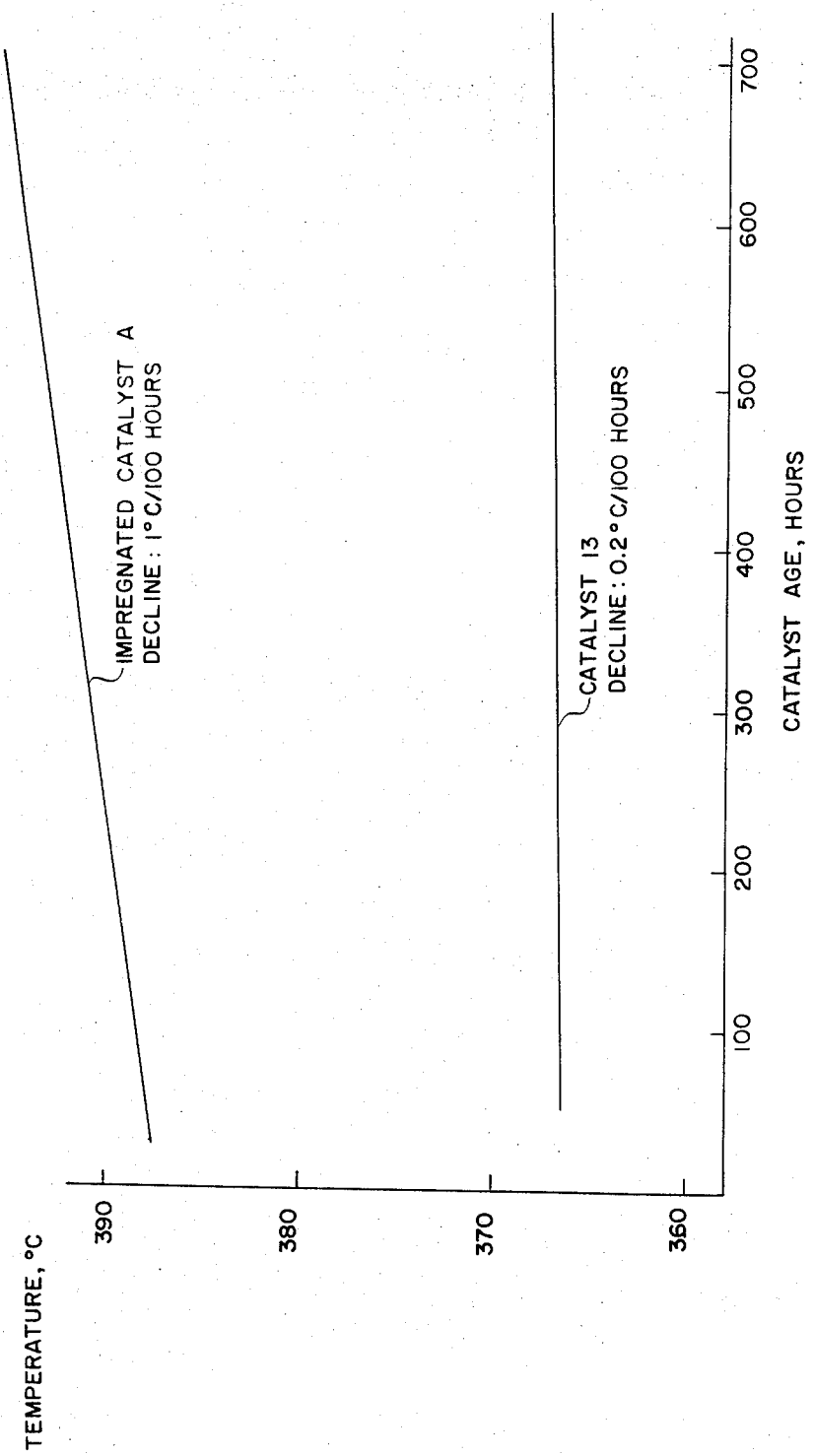

HYDROCONVERSION PROCESS WITH A CATALYST HAVING A HYDROGENATION COMPONENT COMPOSITED WITH A HIGH DENSITY ALUMINA

CROSS-REFERENCE TO RELATED APPLICATION

This application is a continuation-in-part of application Ser. No. 689,342, filed Dec. 11, 1967, now abandoned, and a division of application Ser. No. 36,721, filed May 13, 1970 now U.S. Pat. No. 3,673,112.

BACKGROUND OF THE INVENTION

1. Field of the Invention

This invention relates to an improved method of preparing dual-function hydroconversion catalysts. More particularly, it relates to incorporation of a high concentration (30–65 percent w, as oxides) of a hydrogenation metal component into a suitable hydrogel precursor of an alumina support having a high bulk density (0.8–1.6 g/cc) and a low pore volume (0.15–0.45 cc/g) to produce highly active catalysts. The invention is especially suitable for the production of hydrogenation or denitrification catalysts.

2. Description of the Prior Art

Hydroconversion catalysts are well known in the art and find wide application in the petroleum refining industry. Catalyst dual functionality is equally important in hydrofining (desulfurization, denitrification, oxygen and metal removal), catalytic reforming and hydrocracking. The acidic or cracking function is usually supplied by the catalyst support or the catalyst support enhanced by acidic promoters such as halogens. Usual supports are various refractory oxides particularly alumina, silica and mixtures thereof. Hydrogenation activity on supported catalysts is supplied by a hydrogenation metal component which may exist in the final catalyst as the metal, the metal ion complexed with the support structure and other promoters, or metal compounds, notably the oxides and sulfides. Typical hydrogenation metals are metals of Group IB, VIB and VIII of the Periodic Table of Elements. In many cases, the relative activity of the hydrogenation function depends, inter alia, upon the amount of hydrogenation metal incorporated into the catalyst. It is well known that refractory oxides (xerogels) are limited in the amount of metal which can be effectively incorporated by impregnation, reaction or ion exchange. Good dispersion of the metal component is essential to high activity and dispersion is generally poor at high metal loadings.

In many applications of catalysts having dual functions, i.e., hydrogenation and cracking, the mere existence of dual catalytic sites is not sufficient. The respective activities must be interrelated and balanced to achieve the desired results. Moreover, in practical catalysts the physical properties of the catalyst composite are often as important as the catalytic activity. Thus, to be useful, the catalyst must have sufficient mechanical strength to resist crushing and/or attrition in use. Catalytic reactions generally occur on the internal surface and it is considered desirable that the catalyst have high surface area and large pore volume. In the preparation of impregnated catalysts, it is important to use bases of high surface areas and pore volumes because impregnation of a support with metals fills the pores and reduces surface area.

Catalyst bulk density is also of considerable importance, since in fixed bed systems the bulk density determines the weight/volume relationship of the system and is an important factor in establishing space velocity relationships. Catalysts having low bulk density will fill a given reactor volume at a lower total cost. However, the reduced cost can be illusory unless the low bulk density catalysts are very active. On the other hand, sometimes unusually high activity can be achieved only with catalysts of high bulk density. While catalyst costs are higher on a volumetric basis, high activity permits smaller reactors and higher liquid hourly space velocities and reduced operating costs.

Heretofore metal contents greater than 15 percent w have been effected by impregnation of the support with solutions of metals or metal complexes. For example, in U.S. Pat. No. 3,114,701 to Jacobson et al., it is indicated that from 4–10 percent w nickel together with 19–30 percent w molybdenum, expressed as metals, can be impregnated on predominantly alumina carriers to produce a hydrofining catalyst. To permit the required incorporation of more than 19 percent w of metals without substantially filling the pores, a pore volume of greater than 0.4 cc/g is preferred. Since the impregnation with large quantities of metals reduces the surface area it is desired to start with a carrier having a surface area in excess of 150 m$^2$/g. It is also known to prepare catalysts by mixing refractory oxide gels with a solution of one or more metal salts then heating the mixture to eliminate the whole or the bulk of the moisture by evaporation (e.g., Michael et al., U.S. Pat. No. 2,500,197).

Impregnated catalysts frequently suffer from non-uniform incorporation of metal salts in the pores of a support. Evaporation of metal salt impregnating solution is non-uniform because of variations in pore size; on drying, evaporation occurs first from the larger pores. This results in poor distribution of promoters in the support and decreased catalytic activity.

This invention is based on the discovery that by incorporating large concentrations of a hydrogenation metal component into an alumina hydrogel of a high density support having a low pore volume and adding a halogen cracking component as required, preferably along with the hydrogenation metal component, a hydroconversion catalyst can be prepared which is highly active for hydrogenation of polyaromatics and olefins, hydrodesulfurization and hydrodenitrification of hydrocarbon feeds. Additional advantages of the invention are disclosed in the discussion which follows.

SUMMARY OF THE INVENTION

In broad aspect the invention is the incorporation of 30–65 percent w (as oxides) of hydrogenation metal components into a hydrogel of a high bulk density (0.8–1.6 g/cc), low pore volume (0.15–0.45 cc/g) alumina support, in the presence of water, preferably at temperatures in excess of 50° C.

Specifically, the invention relates to a method of preparing hydroconversion catalysts which contain between 30–65 percent w of the oxides of nickel, molybdenum, tungsten, cobalt and mixtures thereof and hydrodenitrification and hydrogenation processes. Generally, these catalysts will be used in sulfided form, but the invention is not limited to that form. These catalysts are also active when not sulfided. The composite may also contain a cracking component, preferably fluoride, which is present in amounts generally up to 10 percent wt, but which may be higher.

Special aspects of the invention include an improved procedure for increasing the filtration and washing rates of hydrogel-promoter composites thereby eliminating one of the major disadvantages of incorporating metals into suitable alumina hydrogels.

BRIEF DESCRIPTION OF DRAWING

The drawing shows the temperature requirement versus catalyst age for hydrodenitrification of a hydrocracking feedstock from 2,800 ppmw nitrogen to 3 ppm under conditions set out in detail in Example VII.

DETAILED DESCRIPTION

The term "hydrogel" as used herein and in the claims refers to the undried gels, precipitated hydrous oxide or combinations thereof, which may be washed free of salts resulting from the gelation or precipitation reactions. These hydrogels contain about 60 to 95 percent water which is held in semi-rigid particulate form within the pores or interstices of the gel particles. These hydrogels are then to be distinguished from sols and dried gels (xerogels). The term "sol" is used customarily to describe colloidal dispersions which behave as true liquids. Xerogels are the products obtained by drying hydrogels wherein the structure of the oxide gel is set irreversibly. While the dried gels may contain water of hydration they are considered to be an essentially dry rigid solid.

Suitable alumina hydrogels of the support can be made in various ways well known to the art, as illustrated in the examples. The physical properties of aluminas are highly dependent on the conditions under which the hydrogel is precipitated. By careful control of preparation variables aluminas having specified bulk densities and pore volume can be prepared. Properties of hydrogels can be altered after precipitation, however, by chemical or physical treatment, such as comminution (see, e.g., U.S. Pat. No. 3,390,100). It is critical to this invention that the preparation method be one which incorporates a high concentration of hydrogenation metal component into a suitable alumina hydrogel. Suitable hydrogels are defined in terms of the properties of alumina xerogels prepared from hydrogels which have been dried in air at 120°C and calcined in air at 550°C. The physical properties of the xerogel are not normally determined because the hydrogenation metal component is incorporated into the hydrogel before drying and calcining. Suitable hydrogels are those which would on drying and calcining without a hydrogenation metal component have a compacted bulk density between 0.8–1.6 g/cc and a pore volume between 0.15–0.45 cc/g. This method is used to specify the suitability of a hydrogel because the bulk density of a composite of a calcined hydrogel containing promoters will vary depending on the kind and concentration of promoters used. Surprisingly, the pore volume of a composite containing promoters is often no less than that of the starting alumina xerogel without promoters. Contrary to impregnation methods this makes low pore volume aluminas desirable.

In a preferred feature of the invention, metal components are incorporated into an alumina hydrogel by contact with an aqueous solution of metal salts under hydrothermal conditions, which are defined as elevated temperature in the presence of sufficient water to maintain any unincorporated ions in solution. Elevated temperatures are above 50° C, and preferably at temperatures near the boiling point of the solution of the metal to be incorporated. The preferred range is between 60° and 250° C. The amount of water required in the hydrothermal incorporation is an amount sufficient to maintain unincorporated metal ions in solution. Hydrothermal incorporation results in pronounced and surprising effects, not only on catalyst activity and selectivity but also upon metal uptake and catalyst bulk density.

A hydrogenation metal component suitable for incorporation into an appropriate alumina hydrogel includes tungsten, molybdenum, nickel, cobalt and mixtures thereof. Particularly suitable combinations are tungsten-nickel, molybdenum-nickel and cobalt-molybdenum. These metals are converted to oxides when the composite is dried and calcined. The catalysts of the invention can contain between 30–65 percent w hydrogenation metal component (as oxides), although the preferred range is between 40–60 percent w. Especially preferred combinations are 10–18 percent w nickel oxide and 25–40 percent w tungsten oxide or 20–40 percent w molybdenum oxide.

It is also often desirable to incorporate an acidic promoter, as well as a hydrogenation metal into the catalyst. Thus, for example, halogens and particularly fluoride are useful catalyst components for many applications. Any suitable halogen compound may be employed. Ammonium halides, e.g., ammonium fluoride or ammonium bifluoride, are preferred. Incorporation of these halogen promoters in common solution with the hydrogenative metal is expedient but they can be incorporated separately. The acid promoter can comprise up to 10 percent w or more of the final composite, but preferably will be between 1–9 percent w. The amount of fluoride added to the composite will vary depending on the degree of cracking desired in the process.

Pressure is not an important variable per se in the practice of the invention but when temperatures above the boiling point of the metal solution are used autogenous pressure is required to prevent excessive evaporation of the water used in the hydrothermal treatment. No evaporation is required to convert the hydrogenation metals into a form which is retained by the support as required in Michael et al (U.S. Pat. No. 2,355,388).

To achieve the hydrothermal conditions of the invention it is necessary to use an aqueous solution of a metallic salt of the metal to be incorporated. Aqueous complexes such as amines may also be used. Cobalt and nickel are conveniently incorporated from a salt solution, e.g., the nitrate or acetate. Tungsten can be conveniently incorporated from the meta-tungstate as, for example, ammonium meta-tungstate. Ammonium para-tungstate is also suitable. Molybdenum can conveniently be incorporated from the molybdate salt, e.g., ammonium molybdate. Heteropoly compounds of tungsten or molybdenum may also be used.

The technique of the invention results in effective metal utilization in the catalyst at high concentrations and allows greater efficiency in preparation and increased catalyst activity owing to the effective hydrogenation metal incorporation. The usual observation in catalysis is that activity can be increased only to a degree through increases in promoter level but that the effectiveness of each additional increment of promoter is successively less. Surprisingly, a greatly improved catalyst is realized with the proper combination of alumina hydrogel and method of promoter incorporation. The weight of promoters can actually exceed that of the support while high performance is nevertheless realized for successive increments. For example, an extremely active hydrogenation and hydrodenitrification catalyst has been prepared by the method of the invention wherein the support was only 44 percent of the total catalyst weight. Nickel oxide, tungsten oxide and fluoride constituted the remainder of the catalyst.

The amount of metal incorporated depends to some extent upon the relative concentration of the components, the temperature, the pH of the incorporating solution and the nature of the alumina.

While the nature of the catalyst support influences the bulk density of the final catalyst, it has surprisingly been found that the bulk density decreases with increased temperature of catalytic promoter incorporation. Thus, at any given temperature of incorporation the nature of the alumina will determine the bulk density of the final support. The advantages of high temperature incorporation of metals into alumina hydrogels more than offset the small decrease in bulk density of the composite provided that a hydrogel is prepared which would on drying and calcining without a hydrogenation metal have a bulk density between 0.8–1.6 g/cc.

The time required for hydrothermal incorporation is not critical. It may be as long as 24 hours, but 1 to 6 hours are usually sufficient.

While certain metals are largely responsible for hydrogenation and denitrification activity of a catalyst, their effectiveness is determined not merely by the amount present but also by the nature of the support and the manner of compounding the promoters with the support.

Metals are incorporated into the hydrogel by adding to the hydrogel an aqueous solution of the desired metal salt. For example, nickel-tungsten can be added by mixing with the hydrogel a solution containing nickel acetate and ammonium metatungstate. Preferably, the mixture will be heated to a temperature of at least 50° C. If temperatures above the boiling point of the solution are used, it is desirable to carry out the incorporation in an enclosed vessel such as an autoclave under the autogenous pressure of the solution.

Alumina hydrogels are generally prepared by the precipitation of one or more aluminum salts, such as aluminum sulfate, nitrate or acetate or sodium aluminate. Extraneous counter ions, i.e., alkali metal, sulfate, nitrate, acetate, etc., are thus introduced along with the aluminum. Prior art teaches removal of these counter ions from the support prior to the addition of the hydrogenation metal components. In the present invention these extraneous counter ions can be removed by washing the hydrogel prior to the incorporation of the hydrogenation metal promoters. However, washing of hydrogels can be time-consuming because of slow filtration rates. Often hydrogels which filter rapidly are not suitable as supports for this invention because low bulk density aluminas result. A method for overcoming this difficulty has now been discovered and is a preferred feature of this invention. This entails delaying all or some of the washing steps for removal of counter ions until (1) after the hydrogenation metal components have been incorporated, (2) the resulting hydrogel has been formed or shaped, such as by extrusion, and (3) after the formed hydrogel has been partially dried or otherwise dehydrated. The washing steps involved in this method including filtration are exceedingly rapid. It is essential that 3 to 60 percent w water be removed from the shaped gel, preferably by heating in air, an inert gas, or under evacuation to achieve the benefits of the method. Drying must be sufficient to stabilize the outside surface of the preformed hydrogel; otherwise, the hydrogel particles will tend to stick together and the form will be lost during the washing. If 60 to 100 percent of the water is removed prior to washing, the preformed particles disintegrate during the washing. Thus, this dehydration should remove 3 to 60 percent of the water content, preferably 5 to 50 percent. This hydrogel washing procedure is illustrated in Example VIII. It is not restricted to the catalysts of the invention but can be used to increase the filtration rates of hydrogels which contain hydrogenation metals at concentrations less than required herein. The method is also applicable to hydrogels other than alumina, such as silica, silica-alumina, silica-magnesia, etc.

Before use, the calcined catalyst is frequently presulfided to convert the metal oxides, at least in part, to the sulfide form. Sulfiding can be effected by any suitable means known in the art. For example, the catalyst can be sulfided by contacting the catalyst with a stream of hydrogen containing from about 1 to 20 percent or more by volume of $H_2S$, usually at an elevated temperature of about 100°–650° C. Instead of hydrogen sulfide, other sulfide compounds, preferably non-coking sulfiding agents, can be employed. Sulfur compounds in the feedstocks can also be used to convert the catalyst to sulfide form. If desired, the calcined catalysts may first be subjected to a hydrogen reduction treatment to reduce the metal oxide at least in part to the metal, which then may be subjected to sulfiding by a suitable sulfiding agent.

The catalysts are preferably employed in the form of discrete particles, such as granules, extrudates, pellets and the like, usually ranging in size from about one-sixteenth inch to about one-half inch in average diameter. These particles are preferably disposed in a stationary bed within a suitable reactor capable of withstanding high pressure.

In a preferred aspect the method of the invention is particularly suitable for preparation of hydrodenitrification catalysts.

Feedstocks which may be subjected to hydrodenitrification treatment include, in general, any petroleum fraction boiling between about 30°–540° C, preferably about 250°–540° C, and containing generally between about 0.001–5 percent w or more of organically combined nitrogen. Specific examples of suitable stocks include reduced crude oils, deasphalted reduced crudes, light gas oils, heavy gas oils, kerosenes, naphthas, cycle oils from cracking operations, and the like. These stocks may be derived from petroleum, shale, tar sand, coal and any similarly natural deposits.

Suitable hydrodenitrification conditions are as follows:

| | Broad | Preferred |
|---|---|---|
| Temperature, °C | 250–480 | 315–470 |
| Pressure, psig | 100–5000 | 500–3000 |
| LHSV (volume of feed/volume of catalyst/hour) | 0.1–10 | 0.5–5 |
| $H_2$/oil, SCF/BBL | 200–15,000 | 500–10,000 |

In the hydrodenitrification process, the organic nitrogen compounds in the feedstock are converted into ammonia which may readily be removed from the effluent, such as by water-washing. Hydrodenitrification is normally accompanied by some production of low boiling products. This primarily results from the removal of the sulfur, nitrogen, and oxygen impurities from the hydrocarbon feed, although some cracking may take place. In general, the amount of products boiling lower than the feed is less than 20 percent w and often less than 15 percent w. In the case where the hydrocarbon fraction is to be subsequently hydrocracked, higher severity can be used to achieve some hydrocracking in the hydrodenitrification process if desired.

The following examples illustrate the invention. All catalysts were presulfided prior to use.

EXAMPLE I

An alumina hydrogel was prepared by adding concurrently separate solutions of $Al_2(SO_4)_3 \cdot 18H_2O$ (37 g/liter) and $NaAlO_2$ (30.5 g/liter) to 10 liters of distilled water at rates adjusted to maintain the pH at 9. Approximately 5 liters of each solution was used. Thorough stirring was employed throughout the addition, which required approximately 40 minutes. The hydrogel was then filtered and washed with acidulated water, distilled water containing a few drops of sulfuric acid in 5 gallons of water.

Catalyst 1 was prepared by slurrying the washed alumina hydrogel filter cake with a solution of promoters containing 117 grams $Ni(C_2H_3O_2)_2 \cdot 4H_2O$, 75.8 grams ammonium metatungstate and 27.2 grams $NH_4FHF$ in one liter of water. The pH was adjusted to 6.5 with ammonium hydroxide and the mixture was maintained at about 20° C with stirring for about 6 hours. During this treatment the hydrogenation metal components and the fluoride were incorporated into the alumina hydrogel. The hydrogel was then filtered, washed with 1,200 cc of distilled water, dried at about 115° C and calcined for 3 hours at 550° C.

Catalyst 2 was prepared in the same manner except that the hydrogel slurry was maintained at 80° C while the hydrogenation metal components and fluoride were being incorporated. Both catalysts were prepared from a hydrogel suitable for this invention. The xerogel obtained on drying and calcining such hydrogels without added metals or halides had a bulk density of 0.87 and a pore volume of 0.28.

These catalysts were used to hydrotreat a straight run heavy gas oil (API gravity approximately 23.5; 95 percent v boiling above 271° C, 1,400 ppm N) at 1,500 psig pressure, 13/1 hydrogen to oil molar ratio and a liquid hourly space velocity (LHSV) of 0.67. After a period of catalyst conditioning the temperature required to reduce the feed nitrogen content from about 1,400 ppmw to 3 ppmw was measured to determine catalyst activity. Ten ppm fluoride as orthofluorotoluene was added to the feed during the test period. Catalyst composition and test results were as follows:

TABLE 1

| Catalyst No. | 1 | 2 |
|---|---|---|
| Promoter Incorporation Temp., °C | 20 | 80 |
| NiO, %w | 8.9 | 15.0 |
| $WO_3$, %w | 34.0 | 32.9 |
| F, %w | 7.7 | 7.7 |
| Total Promoters | 50.6 | 55.6 |
| Bulk Density, g/cc | 1.32 | 1.25 |
| Pore Volume, cc/g | 0.23 | .25 |
| Hydrogenation Temp., °C | 348 | 345 |

These tests illustrate that both catalysts are highly effective hydrogenation and denitrigication catalysts but that hydrothermal incorporation of metal is preferred.

Catalyst 2 is at least 17° C more active in the same test than the best nickel-molybdenum-fluoride and nickel-tungsten-fluoride commercial catalysts tested. A temperature difference of 17° C indicates that catalysts of the invention are about twice as active as the commercial catalysts tested. For example, a portion of Catalyst 2 was tested using the same feed and operating conditions except that the LHSV was increased to 1.25. The temperature required to denitrify the feed to 3 ppmw was 362° C, which was the same as that required by the best commercial catalyst at an LHSV of 0.67. This temperature requirement was being maintained after 1,400 hours total catalyst age when the test was discontinued. Thus, the catalyst has sufficient activity to perform stably at the increased space velocity.

EXAMPLE II

To demonstrate its versatility in reducing polyaromatics, Catalyst 2 was tested with the same feed and operating conditions used in Example I except that the pressure was reduced from 1,500 psig to 1,100 psig and then to 900 psig. The temperature required to denitrify to 3 ppmw was 358° and 362° C, respectively. Operation was stable at each pressure level for about 400 hours when the test was terminated. For a given value of organic nitrogen in the product more extensive molecular weight reduction was achieved at reduced pressure. The sulfur content of the feed was reduced from 9,400 ppmw to 160 and 240 ppm, respectively. Operating conditions and other test results were as follows:

TABLE 2

| Catalyst No. | | 2 | |
|---|---|---|---|
| | Feed | | Product |
| Catalyst Age, Hours | — | 1791 | 2266 |
| Hydrogenation Temp., °C | — | 358 | 362 |
| LHSV | — | .67 | .67 |
| $H_2$/Oil Ratio | — | 12.9 | 13.2 |
| Material Boiling Below 271°C, g/100 g Feed | | 87.6 | 82.0 |
| Pressure, psig | | 1100 | 900 |
| Nitrogen, ppmw | 1400 | 0.6 | 1.9 |
| Aromatics, moles/100 g | | | |
| mono | 81.7 | 78.1 | 92 |
| di | 34.7 | 3.7 | 6.8 |
| tri | 17.4 | 0.8 | 1.4 |
| tetra | 5.5 | 0.8 | 1.3 |
| Total | 139 | 83.4 | 101.5 |

These results indicate that catalysts of the invention are highly effective in hydrogenating polyaromatics to produce a predominantly monoaromatic second-stage hydrocracking feed that is very low in organic nitrogen.

EXAMPLE III

To demonstrate the marked effect of fluoride on catalyst properties a series of five catalysts was prepared by the method used for Catalyst 2 (Example I), differing only in the concentration of fluoride compound in the solution used to incorporate promoters. Properties of these catalysts were as follows:

TABLE 3

| Catalyst No.[a] | Fluoride, %w | Pore Volume cc/g | Surface Area $m^2$/g | Average Pore Diameter A |
|---|---|---|---|---|
| 3 | 0 | 0.185 | 211 | 35 |
| 4[b] | 0.5 | 0.238[c] | 245 | 39 |
| 5 | 1.8 | 0.252[c] | 193 | 52 |

| 6 | 4 | 0.249[c] | 140 | 71 |
| 7 | 7.4 | 0.247 | 119 | 83 |

[a]Catalysts contain approximately 14 percent w NiO and 34 percent w WO$_3$.
[b]Catalyst 4 was prepared using nickel nitrate. All other catalysts were prepared from nickel acetate.
[c]Pore volume estimated from the observed bulk density of the calcined catalyst.

Note that pore diamter increases with fluoride concentration; surface area decreases, while pore volume increases somewhat. Thus, by using the preparation method of the invention catalyst physical properties can be controlled by appropriate selection of fluoride concentration.

EXAMPLE IV

This example demonstrates the advantages of a high content of hydrogenation metals incorporated hydrothermally into an alumina hydrogel, which if dried without hydrogenation components would have a high bulk density and low pore volume. Catalysts having low hydrogenation metals concentration incorporated into suitable hydrogels as well as catalysts with high promoter concentration incorporated into unsuitable hydrogels were prepared and compared with Catalyst 2, Example I.

Catalyst 8 was prepared according to the method of Example I. However, an unsuitable alumina hydrogel was used. This hydrogel was precipitated by the concurrent addition of 2½ liters of a solution containing 375 g Al$_2$(SO$_4$)$_3$·18H$_2$O and 2½ liters of a solution containing 305 g sodium aluminate, at rates adjusted to maintain the pH at 9. After washing, one-half of this hydrogel was slurried with 1,000 cc of an aqueous solution containing 117.2 g Ni(C$_2$H$_3$O$_2$)$_2$·4H$_2$O, 76 g ammonium metatungstate and 27 g NH$_4$FHF. The pH of the slurry was adjusted to 6.5 with ammonium hydroxide and the mixture was then heated for 6 hours at 80° C. The product was filtered, washed with 1,200 ml of distilled water, dried at 120° C, and calcined at 550° C. Table 4 shows this hydrogel is unsuitable. The xerogel obtained from it without added metals has too low a bulk density.

The alumina hydrogel for Catalyst 9 was a suitable hydrogel for this invention, as seen from the properties of the xerogel without metals in Table 4. It was prepared at pH 9 from the simultaneous introduction of 8 liters of Al(NO$_3$)$_3$·9H$_2$O solution (104 g/liter) and 715 ml of concentrated ammonium hdroxide. A ten-liter water heel was used. The hydrogel product was filtered and washed four times with 2,000-ml portions of distilled water. This hydrogel was treated with a solution containing 64.4 g Ni(NO$_3$)$_2$·6H$_2$O, 41.7 g ammonium metatungstate, and 15.0 NH$_4$FHF in 300 ml H$_2$O for 6 hours at 80° C. The pH of the slurry was raised to 6.5 with ammonium hydroxide prior to the heating. The product was filtered, washed with distilled water, extruded, dried and calcined. This catalyst had a total hydrogenation component of only 25.3 percent and thus is an illustration of the incorporation of too low an amount of hydrogenation component into a suitable hydrogel.

For comparison Catalysts 8 and 9 were tested in the same manner as Catalyst 2 in Example I. The metals were incorporated hydrothermally into the hydrogel at 80° C for the three catalysts. Properties of the corresponding alumina xerogels containing no promoter metals or fluoride are listed.

These catalysts were tested using the same feed and operating conditions of Example I. Catalyst properties and results were as follows:

TABLE 4

| Catalyst No. | 8 | 9 | 2 |
|---|---|---|---|
| A. Properties of Alumina Xerogel Without Metals | | | |
| Bulk Density, g/cc | 0.42 | 0.85 | 0.87 |
| Surface Area, m$^2$/g | 247 | 287 | 270 |
| Pore Volume, cc/g | 0.304 | 0.430 | 0.278 |
| Average Pore Diameter, A | 49 | 60 | 41 |
| B. Properties of Finished Catalyst | | | |
| NiO, %w | 16.4 | 7.7 | 15.0 |
| WO$_3$, %w | 35.3 | 17.6 | 32.9 |
| F, %w | 7.5 | 5.3 | 7.7 |
| Total Promoters, %w | 59.2 | 30.6 | 55.6 |
| Bulk Density, g/cc | .71 | 1.07 | 1.25 |
| Pore Volume, cc/g | .35 | .31 | .25 |
| C. Test Results | | | |
| Hydrogenation Temperature, °C | >356 | 377 | 345 |

Catalyst 2 with a large percentage of promoters incorporated into a high density low pore volume alumina is clearly superior to catalysts which have a large percentage of promoters on a low density support or a low percentage of promoters on a high density, low pore volume support. The testing of Catalyst 8 was terminated at 200 hours. Initial deactivation was still occurring, so that an even higher temperature requirement was probable after the catalyst lined out.

EXAMPLE V

Catalyst 11 containing nickel, molybdenum and fluoride on alumina was prepared with the same hydrogel and in a similar manner as Catalyst 2, Example I. This catalyst was tested using the same feed and conditions of Example I. For comparison the best available nickel-molybdenum-fluoride impregnated catalyst, A, was tested under the same conditions. The properties and temperature requirements to reduce the nitrogen content of the feed from 1,400 to 3 ppmw were as follows:

TABLE 5

| Catalyst No. | 11 | A[a] |
|---|---|---|
| NiO, %w | 14.0 | 3.2 |
| MoO$_3$, %w | 28.5 | 14.1 |
| F, %w | 8.0 | 6.8 |
| Total Promoters | 50.5 | 24.1 |
| Bulk Density, g/cc | 1.16 | 0.87 |
| Pore Volume, cc/g | 0.26 | 0.30 |
| Hydrogenation Temperature, °C | 350 | 361 |

[a]Impregnated catalyst

While the hydrogenation component is lower for the impregnated catalyst than for Catalyst 11, such prior art catalysts do not benefit from higher metal content. Increasing the metals content to 5 percent w NiO and 27 percent w MoO$_3$ in a substantially equivalent impregnated catalyst did not increase the activity, i.e., did not reduce the hydrogenation temperature requirement.

EXAMPLE VI

To demonstrate the excellent hydrogenation characteristics of catalysts of this invention a tungsten-nickel-fluoride on alumina catalyst (12) was prepared similar to Catalyst 2, Example I, and compared with the best available impregnated hydrogenation catalyst A. An olefinic mixture of cracked gas oils (21.4° API) was treated at 1,500 psig, 10/1 hydrogen to oil molar ratio, 1.5 LHSV and 660° F. Catalyst composition and test results were as follows:

TABLE 6

| Catalyst No. | 12 | A |
|---|---|---|
| NiO, %w | 13.4 | 3.2 |
| WO₃, %w | 33.1 | |
| MoO₃, %w | | 14.1 |
| F, %w | 7.5 | 6.8 |
| Total Promoters | 54.0 | 24.1 |
| Bulk Density, g/cc | 1.26 | 0.87 |
| Surface Area, m²/g | 113 | 150 |
| Pore Volume, cc/g | 0.24 | 0.30 |
| Hydrogen Consumption, SCF/bbl | 1450 | 750 |

| | Feed | Product | Product |
|---|---|---|---|
| API Gravity | 21.4 | 30.1 | 26.1 |
| Carbon, %w | 88.6 | 86.9 | 87.8 |
| Hydrogen, %w | 11.0 | 13.1 | 12.1 |
| Nitrogen, ppm | 369 | <0.2 | 0.8 |

Increased hydrogen uptake demonstrates the high activity of catalysts of the invention.

EXAMPLE VII

This example demonstrates the ability of catalysts described by this invention to process an unusually refractory feedstock without appreciable deactivation. Catalyst 13 was prepared in the same manner as Catalyst 2, Example I, and had essentially the same composition and properties. It was used to hydrotreat a particularly heavy straight-run gas oil (19.3° API, 99 percent boiling above 271° C, 2,800 ppm N). Operating conditions were 2/3 LHSV; H₂/Oil ca, 6,500 SCF/bbl; 1,500 psig. No fluorine was added to the feed during the test. The attached drawing illustrates the temperature required to hydrotreat this feedstock to reduce the nitrogen content to 3 ppm, when processed by Catalyst 13 and by the best impregnated Catalyst A (Examples V and VI). Catalyst 13 is seen to be both more active and more stable.

EXAMPLE VIII

This example illustrates a preferred method employed to increase the filtration and washing rates for alumina hydrogels.

An alumina hydrogel suitable for this invention was prepared by adding 2.4 liters of sodium aluminate solution (61 grams per liter) to 2.5 liters of aluminum sulfate solution (74 grams per liter) while stirring vigorously. The pH rose from about 3 to about 9 and was then raised to 10 by adding 240 cc of 3 molar ammonium hydroxide solution. The hydrogel was filtered and rinsed with 8 grams water per gram Al₂O₃. This type of hydrogel is suitable for this invention whether washed fully at this stage or, as in this example, washed after the hydrogenation metal components have been added. Properties of a xerogel, containing no hydrogenation metal components or fluoride, prepared from this type of hydrogel were: bulk density — 0.87 g/cc; surface area — 390 m²/g; pore volume — 0.39 cc/g; average pore diameter — 40 Angstroms. Promoters were incorporated into the hydrogel at 80° C from approximately one liter of a solution containing 117 grams Ni(C₂H₃O₂)₂·4H₂O, 76 grams ammonium metatungstate and 27 grams NH₄FHF. This slurry was filtered and rinsed with 10 grams distilled water per gram Al₂O₃. The filter cake was extruded and dried at 120° C for about 2 hours during which about 20 percent w of the water content was removed. The partially dried extrudate was then given four washes each with 8 grams distilled water per gram Al₂O₃ followed by two rinses each with 8 grams dilute ammonia (pH 10) per gram Al₂O₃. Finally, the material was rinsed with 8 grams distilled water per gram Al₂O₃. These washing steps were very fast.

After drying and calcining as in Example I, Catalyst 14 contained 12.7 percent w NiO, 32.7 percent w WO₃ and 8.0 percent w fluoride. The composite, which had a pore volume of 0.27 cc/g and a compacted bulk density of 1.23 g/cc, was used to hydrotreat a straight run heavy gas oil fraction (19.3° API; 99.0 percent w boiling above 271° C) containing 2,800 ppmw nitrogen. Operating conditions were: 1,500 psig pressure, hydrogen/oil ratio approximately 6,500 SCF/BBL, LHSV approximately 0.67. No fluorine was added to the feed during the test. The temperature required to obtain a product having 3 ppmw nitrogen was about 368° C. Catalyst 13, Example VII, tested under the same conditions had a temperature requirement of 368° C. This preparation method which results in no loss in activity is preferred because of rapid washing of the hydrogel.

EXAMPLE IX

For comparison with catalysts of this invention, a Ni/W/F/Al₂O₃ catalyst (15) was prepared by dry impregnation of a calcined alumina xerogel which had the following properties: compacted bulk density — 0.93 g/cc; surface area — 330 m²/g; and pore volume — 0.41 cc/g. The impregnating solution contained 44.5 g Ni(NO₃)₂·6H₂O, 37 g ammonium metatungstate and 14.5 g NH₄FHF per 100 g H₂O. In order to achieve the desired high metal content in this catalyst, nine separate impregnation steps were required. The properties of the resulting catalyst as determined by analysis were as follows:

TABLE 7

| Catalyst No. | 15 |
|---|---|
| NiO, %w | 11.4 |
| WO₃, %w | 32.5 |
| F, %w | 6.4 |
| Total Promoters | 50.3 |
| Bulk Density, g/cc | 1.78 |
| Surface Area, m²/g | 71 |
| Pore Volume, cc/g | 0.12 |
| Average Pore Diameter, A | 66 |

The hydrogenation metal content of this catalyst, 43.9 percent as oxides, is well within the scope of the invention. Furthermore, the alumina xerogel used meets the requirements defined for hydrogels of this invention. The catalyst differs in the method of preparation.

Catalyst 15 was used to hydrotreat the same straight-run heavy gas oil used in Examples VII and VIII and under the same conditions used for Catalysts 13 and 14 in those examples. The temperature required to denitrogenate the feedstock to 3 ppm was 380° C. In spite of the high metal content and very high bulk density, Catalyst 15 required about 10° C higher temperature that either Catalysts 13 or 14. The advantage of the present invention is illustrated clearly by this comparison.

I claim as my invention:

1. A process for the hydroconversion of a petroleum fraction boiling from 30° to 540° C and containing from 0.001 to 5 percent wt nitrogen, which comprises contacting the fraction with hydrogen at elevated temperatures and pressure in the presence of a catalyst consisting essentially of a hydrogenation component comprising 30 to 65 percent of catalyst weight selected from the group consisting of oxides of nickel, molybdenum, tungsten, cobalt and mixtures thereof, composited with a high density alumina support, said catalyst having been prepared from an alumina hydrogel which would on drying and calcining without a hydrogenation component have a compacted bulk density from 0.8 to 1.6 g/cc and a pore volume from 0.15 to 0.45 cc/g, contacting said hydrogel with an aqueous solution of salts of said hydrogenation component metals of sufficient concentration to achieve the desired hydrogenation component concentration, then drying and calcining the composite.

2. The process of claim 1 wherein the hydrogenation component is 40–60 percent of the catalyst weight and is selected from the group consisting of the oxides of nickel-tungsten, nickel-molybdenum and cobalt-molybdenum.

3. The process of claim 1 wherein the hydrogenation component is 10–18 percent wt nickel oxide and 25–40 percent wt tungsten oxide.

4. The process of claim 1 wherein the hydrogenation component is 10–18 percent wt nickel oxide and 20–40 percent wt molybdenum oxide.

5. The process of claim 1 wherein the conversion is substantially hydrodenitrification, the catalyst composite contains from 1–9 percent wt fluoride and the hydrogenation component is selected from the group consisting of the oxides of nickel-tungsten, nickel-molybdenum and cobalt-molybdenum.

* * * * *